Sept. 4, 1923.

L. B. SPENCER ET AL

DEMOUNTABLE COLLAPSIBLE RIM

Filed Nov. 4, 1922

1,466,765

Inventors
Leo B. Spencer
James E. Spencer
By
Ord B. Billman
Attorney

Patented Sept. 4, 1923.

1,466,765

UNITED STATES PATENT OFFICE.

LEO BURDELL SPENCER AND JAMES EMERSON SPENCER, OF AKRON, OHIO.

DEMOUNTABLE COLLAPSIBLE RIM.

Application filed November 4, 1922. Serial No. 599,057.

*To all whom it may concern:*

Be it known that we, LEO BURDELL SPENCER and JAMES EMERSON SPENCER, citizens of the United States, residing at Akron, in the county of Summit and State of Ohio, have invented certain new and useful Improvements in Demountable Collapsible Rims, of which the following is a specification.

This invention relates to improvements in demountable rims for pneumatic tires, and more particularly to that class or type commonly known as "collapsible rims."

The primary object of the invention is to provide a generally improved tire carrying rim of the class indicated which will be exceedingly simple in construction, cheap of manufacture and efficient in use.

A further and very important object is the provision of a demountable collapsible rim made up of a plurality of hingedly connected main and collapsible rim sections whereby when the tire carrying rim is demounted or removed from the vehicle wheel, the rim may be readily collapsed for quickly detaching the tire therefrom and whereby also the tire may be readily secured upon the collapsible rim by expanding the rim sections to their normal tire engaging positions.

A still further and very important object is the provision of main and collapsible rim sections provided on their inner sides and near the hinged or connected ends thereof with hinge leaf receiving pockets terminating in recesses conjointly forming hinge or knuckle lug receiving openings between the abutting or connecting ends of the rim section together with hinge leaves terminating in hinge lugs seated in said pockets and openings, respectively, and interlocking therewith whereby to strengthen and reinforce the parts at the hinged ends and particularly to relieve the fastening elements of the hinge leaves of shearing action.

With the above mentioned and other ends in view, the invention consists in the novel construction, arrangement and combination of parts, hereinafter described, illustrated in one of its embodiments in the accompanying drawings, and particularly pointed out in the appended claim.

Figure 1:
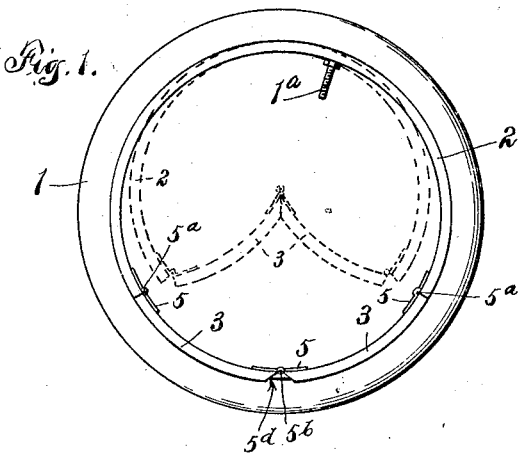

Referring to the drawings, forming a part of this specification, Figure 1 is a side elevation of a rim constructed in accordance with this invention, equipped with an ordinary pneumatic tire, the dotted lines illustrating the relative position of the rim section when collapsed or detached.

Figure 2:
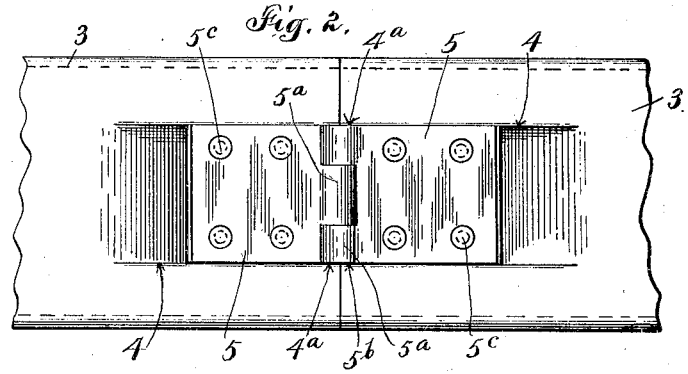

Fig. 2, an enlarged fragmentary plan view of the inner or under side of the hinged or pivotally connected ends of the rim section, and illustrating in particular the improved reinforcing hinge and hinge mounting therefor.

Figure 3:
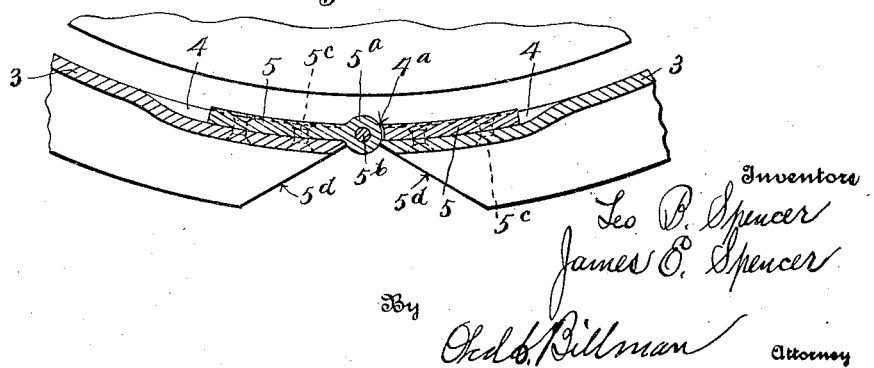

Fig. 3, a central longitudinal sectional view of the same.

Similar numerals of reference designate like parts throughout all the figures of the drawings.

The improved collapsible rim is adapted to be readily attached to or detached from any ordinary pneumatic tire casing 1 and, in the present instance, is provided with relatively straight side flanges to receive beads or heels of the straight sided type.

The improved rim is preferably made up of a main rim section 2, constituting approximately two-thirds of the circumference of the rim when expanded or attached and collapsible rim sections 3, constituting the remainder or approximately one-third of the circumference of the rim when expanded.

The collapsible or toggle acting rim sections 3 are preferably located approximately diametrically opposite the opening in the main rim section for receiving the stem $1^a$, of the inner tube for the pneumatic tire, as shown most clearly in Fig. 1 of the drawings.

As a means of hingedly connecting the rim sections 2 and 3 together and particularly as a means of reinforcing the connected ends of the rim sections and hinge members and also relieving the fastening elements of the latter from shearing action, the rim sections are provided about their inner peripheries with off-set hinge receiving pockets 4, terminating in notches or recesses $4^a$, conjointly forming hinge lug receiving openings between the adjacent or abutting ends of the rim sections.

The improved hinge members or connections preferably comprise hinge leaves 5, terminating in hinge lugs $5^a$, seated in the pockets and openings 4 and $4^a$, respectively. The connected hinge lugs or knuckles $5^a$, are provided with a suitable hinge pin or element $5^b$, extending flush with the outer edges of the hinge leaves and adapted to be seated within and held by the adjacent portions of the recesses 4ª, forming the lug receiving openings between the hinged ends of the sections, as shown most clearly in Fig. 2 of the drawings. The hinged members 5 are secured in their seated or mounted positions in any suitable and convenient manner, as for example,—attaching elements 5ᶜ, in the specific form of rivets.

As a means of limiting the inward movement of the toggle acting or collapsing rim sections 3, the inner pivoted ends of the latter have their adjacent tire beading engaging flanges cut away or bevelled as at 5ᵈ to form abutments or stops when the sections are moved inwardly to the dotted line position shown in Fig. 1 of the drawings.

Having thus described one of the embodiments of the invention, without having attempted to set forth all the forms in which it may be made, or all the modes of its use, what we claim and desire to secure by Letters Patent, is—

A collapsible rim, comprising main and collapsible rim sections constituting approximately two-thirds and one-third, respectively, of the circumference of the rim when expanded, said sections having offset hinge receiving pockets on their inner sides and terminal recesses conjointly forming hinge lug receiving openings at the joints of said sections, and hinge leaves seated in said pockets terminating in hinge lugs extending into said hinge lug receiving openings at the joints of said sections whereby said hinge leaves and the lugs interlock with said rim sections to relieve the fastening elements of shearing action.

In testimony whereof we have affixed our signatures

LEO BURDELL SPENCER.
JAMES EMERSON SPENCER.